(12) United States Patent
Circenis et al.

(10) Patent No.: US 8,595,612 B1
(45) Date of Patent: Nov. 26, 2013

(54) DISPLAY OF WEB PAGE WITH AVAILABLE DATA

(75) Inventors: Edgar Circenis, Ft. Collins, CO (US);
Bryan J. Jacquot, Ft. Collins, CO (US);
Mike Kingdom, Ft. Collins, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 2166 days.

(21) Appl. No.: 11/586,872

(22) Filed: Oct. 26, 2006

(51) Int. Cl.
*G06F 17/00* (2006.01)
(52) U.S. Cl.
USPC ........... 715/234; 715/240; 715/273; 715/760; 709/201; 709/203; 709/219
(58) Field of Classification Search
USPC ......... 715/200–203, 229, 234, 236, 240, 273, 715/700, 760, 804–805; 709/201, 203, 709/218–219, 224, 227
See application file for complete search history.

(56) References Cited

U.S. PATENT DOCUMENTS

| | | | |
|---|---|---|---|
| 5,845,084 A * | 12/1998 | Cordell et al. | 709/234 |
| 6,223,221 B1 * | 4/2001 | Kunz | 709/224 |
| 7,346,843 B2 * | 3/2008 | Hind et al. | 715/234 |
| 2003/0220893 A1 | 11/2003 | Dettinger et al. | |
| 2004/0128285 A1 | 7/2004 | Green et al. | |
| 2004/0243475 A1 | 12/2004 | Aronsson et al. | |
| 2005/0203890 A1 | 9/2005 | Chen et al. | |

\* cited by examiner

*Primary Examiner* — Cesar Paula
*Assistant Examiner* — James H Blackwell

(57) ABSTRACT

A method for executing a web application comprising sending at least one query to at least one data source. After receiving data in response to the query, a web page is created having separate portions. A first of said portions provides for displaying received data, while a second of said portions provides for displaying a first placeholder for yet to be received data. A refresh code is inserted in the second portion. The web page is then transmitted.

21 Claims, 16 Drawing Sheets

DISPLAY OF WEB PAGE WITH AVAILABLE DATA

BACKGROUND

A server-based application that can display a significant amount of data is typically delayed while a web server retrieves the data from a distributed set of resources and builds the page contents prior to transmitting the web page to a web browser.

Some conventional web servers or web applications may perform all discovery upon receiving a request from a web browser, waiting for all discovery to complete, constructing a web page, and transmitting the web page to the browser. The process can take a considerable amount of time during which the user may be idle, awaiting a response on the display, thus unable to work until a new page appears.

Other conventional web servers or web applications do not attempt to transfer pages that contain so much information that accumulation of requested data would take a prohibitively long time, but rather divide assembly of a web page into chunks. For example, a web server that has 1000 pieces of information to gather may split assembly into ten chunks of 100 pieces, each of the ten chunks being accumulated as a separate web page. A requesting web browser is then obligated to access the ten different web pages to view all of the data, a technique that does not allow the user to view all data at one time.

Another conventional technique uses a cache mechanism, adding overhead to ensure cache coherency and data freshness.

SUMMARY

An embodiment of a method for executing a web application comprises sending at least one query to at least one data source, receiving data in response to the at least one query, creating a web page comprising received data and placeholders for yet to be received data, and transmitting the web page to a web browser regardless of web page completion.

BRIEF DESCRIPTION OF THE DRAWINGS

Embodiments of the invention relating to both structure and method of operation may best be understood by referring to the following description and accompanying drawings.

DETAILED DESCRIPTION

A web application can generate a fast display of a web page by displaying data that is available and refreshing periodically until the full page is received.

A web server can create page contents for data that is available, leaving placeholders for missing data. A web page comprising data that is currently available and placeholders for missing data is transmitted to a web browser. A code indicative of a refresh request can be inserted into the web page, causing the web page to autonomously refresh after a predetermined time duration. The refresh time is typically selected according to expectation of the time duration for receiving more data, generally a function of data source and communication network characteristics so that when the page is refreshed, the amount of valid data on the page is expected to increase. Once a page is refreshed and contains a complete set of data, the refresh code is omitted or changed to select a slower refresh rate.

A web application and associated operating method can enable a significant reduction in delay incurred by the web browser while awaiting a response from a web server in making queries and retrieving data in response to the queries for display on the web page.

The web application and associated operating method can also enable a user to see initial results of a request and perform actions utilizing real data displayed on the web page that is unrelated to data that may be missing because the web server has not had time to gather the additional information.

Figure 1:
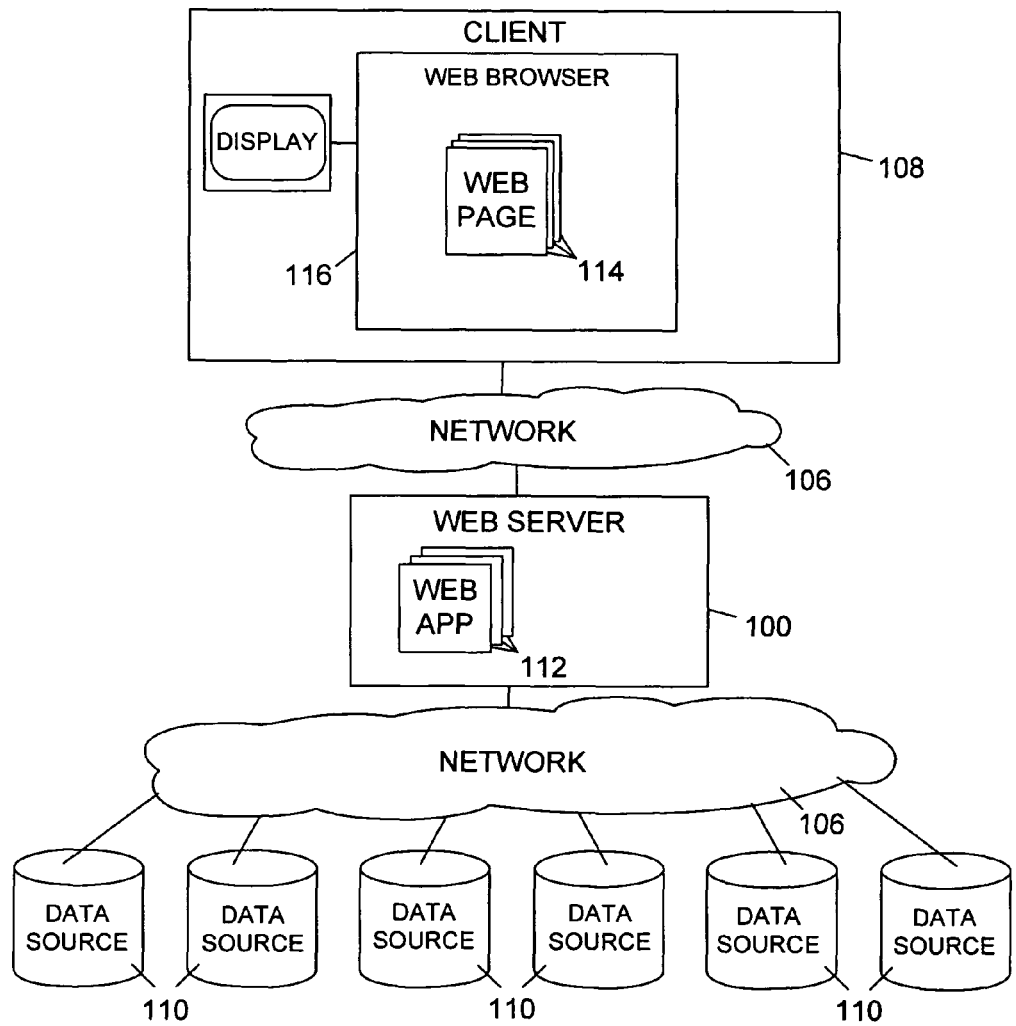
FIG. 1 is a schematic block diagram illustrating an embodiment of a web server configured to execute fast display of a web page with available data, refreshing the web page periodically until the web page is completed.

Referring to FIG. 1, a schematic block diagram illustrates an embodiment of a web application 112 that is configured to execute fast display of a web page 114 with available data, refreshing the web page periodically until the web page 114 is completed. A web client 108 is adapted to communicate on a network 106 among one or more web servers 100 and multiple data sources 110.

In an embodiment of a web server 100, an example web application 112 may create a web page 114 on the web client 108 that displays utilization for one thousand systems. When requesting such a page, a conventional web server 100 typically makes queries on all of the thousand systems, waits for all systems to respond, and only then creates the page and sends the page to the requesting web browser. In contrast, the illustrative web server 100 and web application 112 may or may not have up-to-date information for none, some, or all of the thousand systems. The web server 100 and web application 112 can launch queries in the background, for example as background threads, and create a web page 114 with data that is currently available. If the available data is less than the total requested amount, the server 100 executing a web application 112 inserts a special code into the web page 114 to cause an automatic refresh, for example with a one second refresh rate. If the data becomes complete after refresh, the web server 100 can omit insertion of the automatic refresh code. In some configurations, the web server 100 can refresh the web page 114 periodically whether or not the web page is complete to enable updating of data. For a continuously refreshed web page, a continuous or normal refresh rate, for example five minutes, can be selected.

When an incomplete web page 114 is transmitted to the web browser 116, the web browser 116 can display the web page 114 that contains any placeholder data and/or images specified by the web server 100 for the missing data. When refresh is due, a new request may be passed to the web server 100 for the same web page 114. At the refresh time, typically at least some of the threads launched on the web server 100 have completed and more or all of the data has become available for inclusion into the web page 114. A new and/or updated page can be generated using the illustrative procedure in a refresh process that continues until the data is completely included in the page.

The illustrative web server 100, web application 112, and or associated operating method can improve operations in several aspects. Users typically obtain a working web page 114 in reduced time and in comparison to a system that gathers all data prior to making up and transmitting the web page. On pages that contain data that is both quickly gathered as well as data that takes time to gather, a user who desires quick access to available data is able to progress in the current task without waiting for the remaining data. A user who is not concerned about data that slowly accumulates does not have to wait for all data to be gathered when interested in only a specific item of data. Once the data of interest is present, the user can progress with a task.

Referring to FIGS. 2A through 2G combined with FIG. 1, several flow charts depict embodiments of a method 200 for operating the web server 100 to execute fast display of a web page with available data. The web server 100 can be adapted with programming for running a web application 112. The web server 100 sends 202 one or more queries to one or more data sources 110 and receives 204 data in response to the queries. The web server 100 creates 206 a web page 114 on a web client 108 via actions comprising received data and placeholders for yet to be received data. The web server 100 transmits the created web page 114 to a web browser 116 executing on a client 108 regardless of web page completion.

Typically, the web server 100 includes a code in the web page 114 that indicates to the web browser 116 that the browser 116 is to repeatedly refresh 208 the web page 114 at a selected interval so that newly received data replaces a placeholder until a complete set of data is received.

Figure 2A:
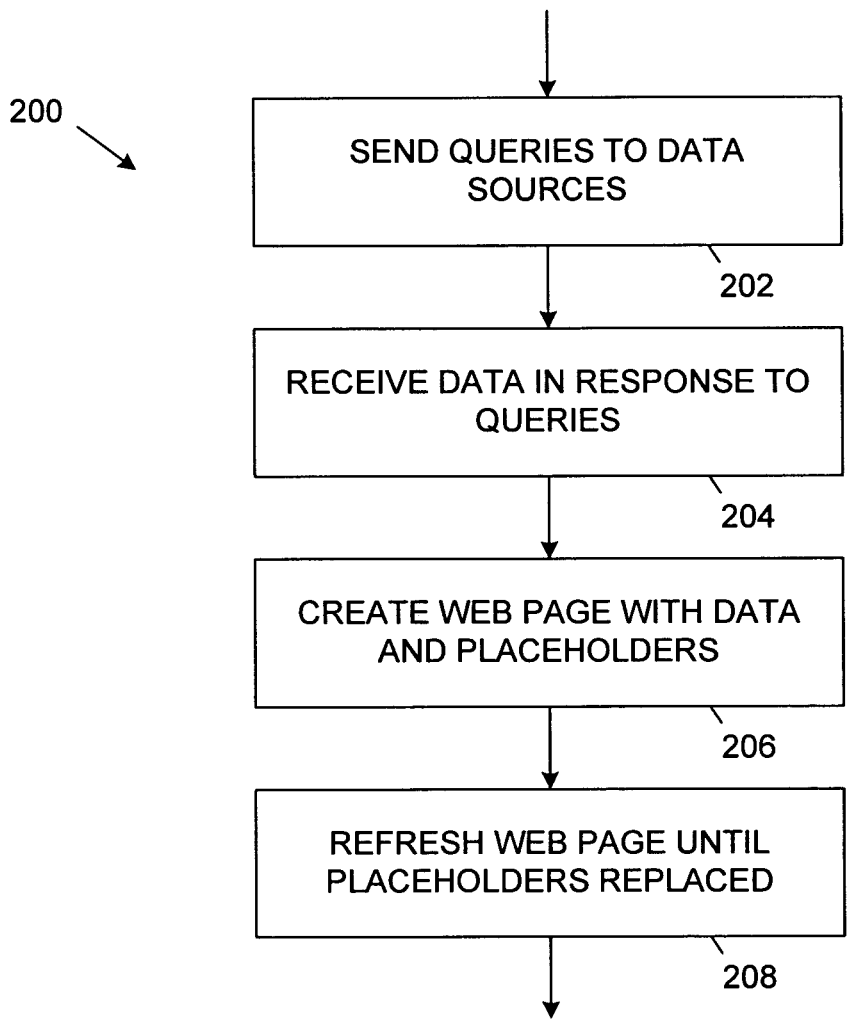
FIGS. 2A through 2G are flow charts that depict embodiments of a method for operating the web server to execute fast display of a web page.
Figure 2B:
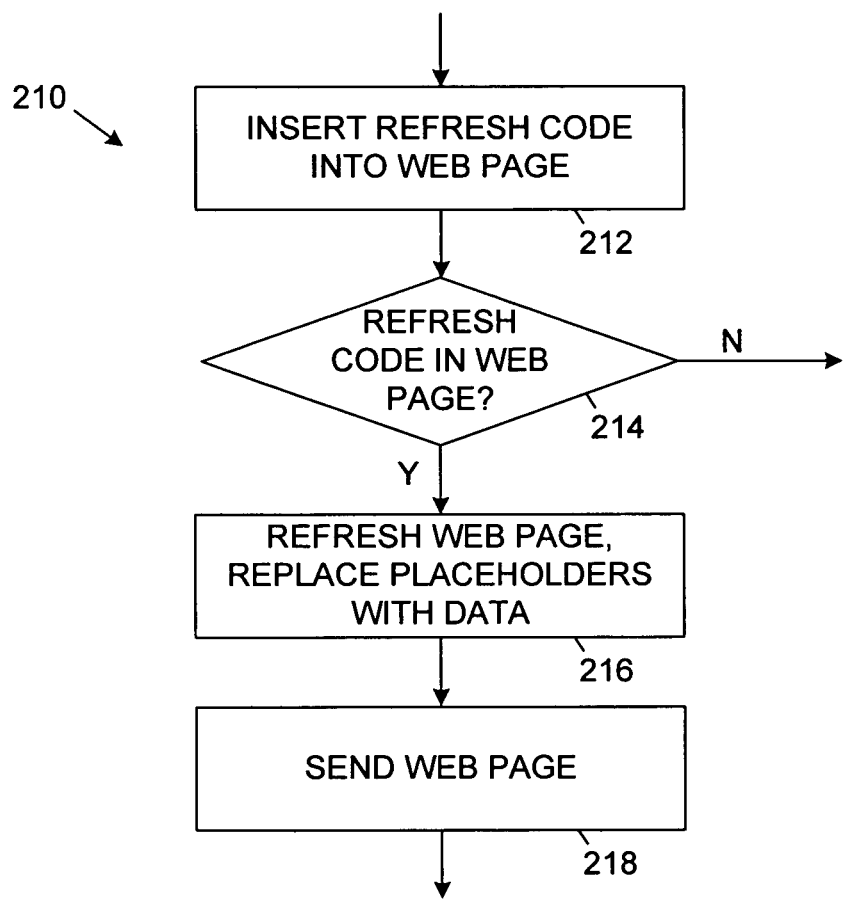
Figure 3A:
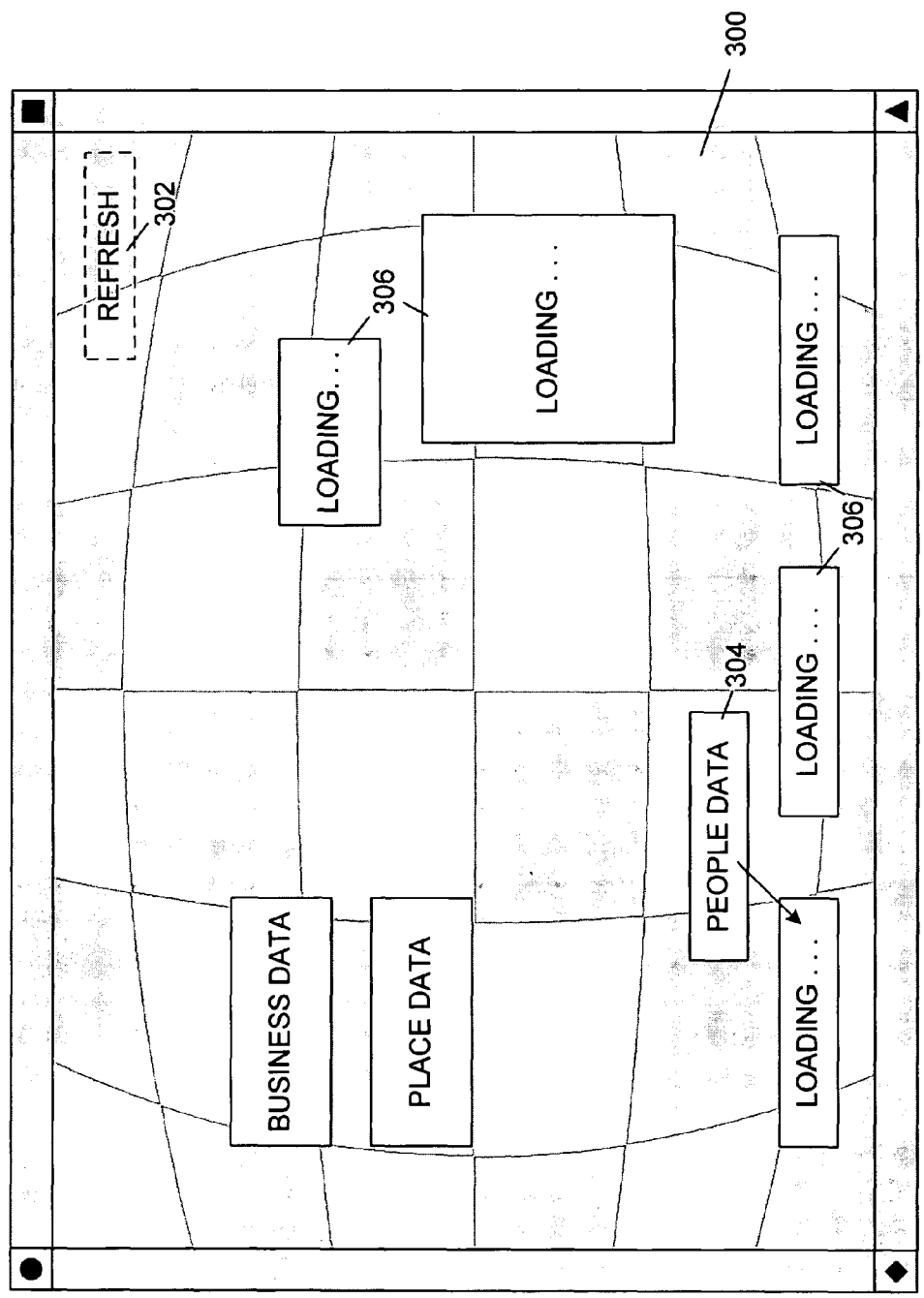
FIGS. 3A and 3B are examples of web page embodiments that facilitate understanding of operations and methods shown in FIGS. 2A through 2G that can be performed of the web server shown in FIG. 1.

Referring to FIG. 3A and FIG. 2B in combination with FIG. 1, an example of a web page 300 and an embodiment of a method 210 for handling the web page 300 are shown. The web server 100 can insert 212 a refresh code 302 into the web page 300. The refresh code 302 is shown with dashed lines to indicate embedding into the web page data but not display on the screen. In the case 214 of the web page 300 with the inserted refresh code 302, the web server 100 can refresh 216 the web page 300 whereby newly received data 304 replaces a placeholder 306 which may be depicted on the screen via a script such as "loading . . . ", hourglass, or other suitable icon. The placeholder 306 indicates that the web page is awaiting a response. The web server 100 sends 218 the updated web page to a web browser 116 for display. If the web page 114 is incomplete, code in the web page 114 causes the browser 116 to refresh the page. The refresh request causes the web server 100 and/or web application 112 to generate a new page, potentially to accumulate further content in a next cycle, but possibly with a refresh code that causes yet another refresh cycle to occur.

Figure 2C:
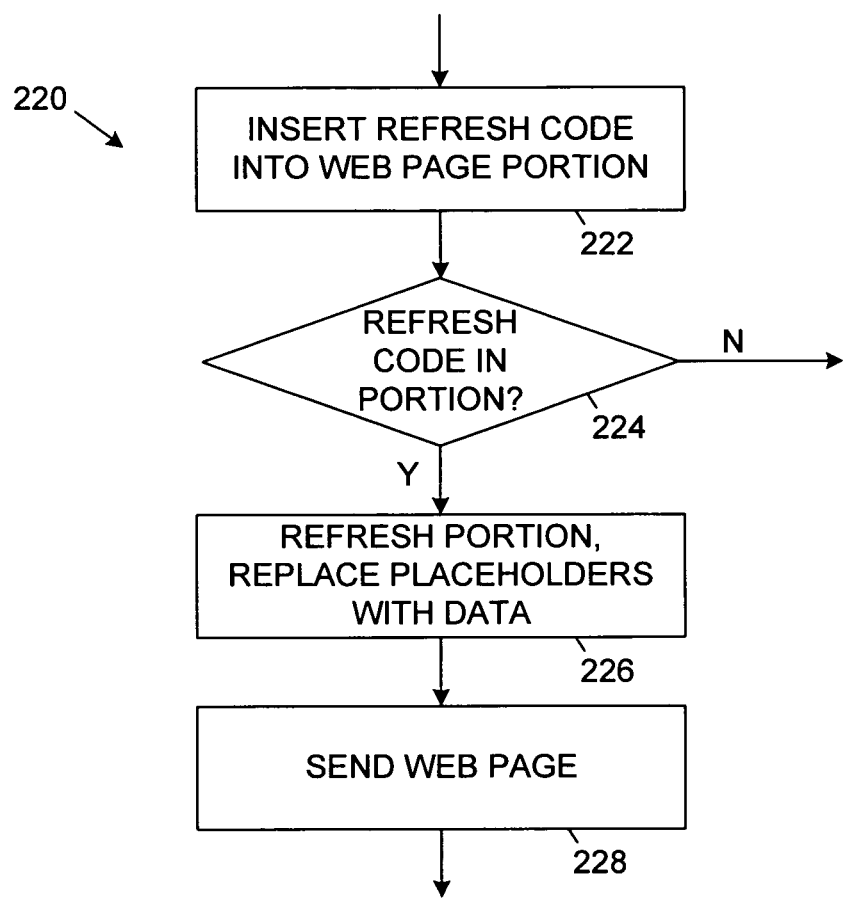
Figure 3B:
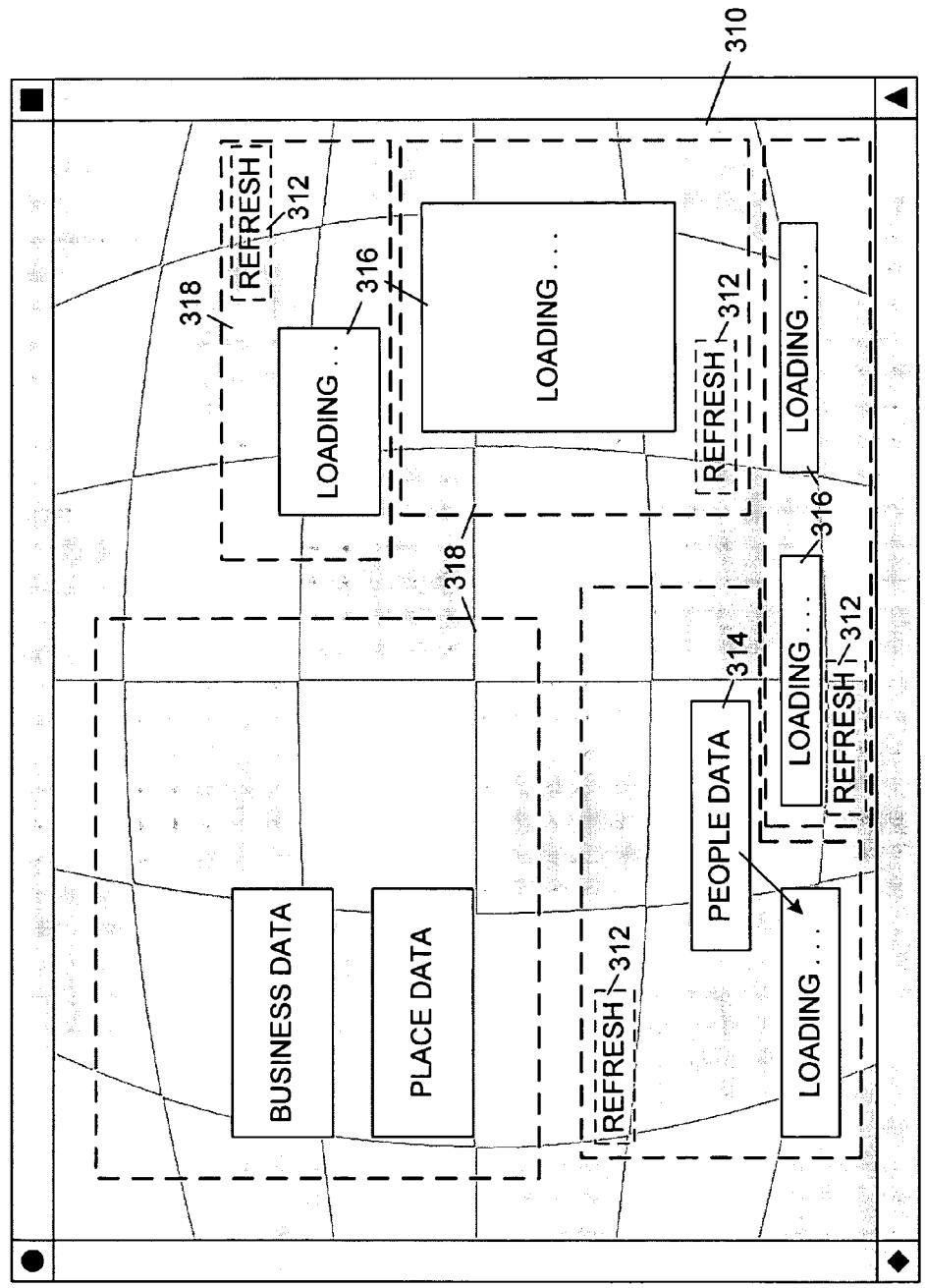

Referring to FIG. 3B and FIG. 2C in combination with FIG. 1, an example of a web page 310 and an embodiment of a method 220 for handling the web page 310 are shown. The web server 100 can insert 222 a refresh code 312 into a portion 318 of the web page 310. In the case 224 of the portion 318 of the web page 310 with the inserted refresh code 312, the web browser 116 can refresh 226 the web page portion 318 whereby newly received data 314 replaces a placeholder 316. The web server 100 sends 228 the updated web page to a web browser 116 for display.

For example, the web server 100 can cause the web browser 116 to refresh part of the web page rather than enabling only updating of the entire page. In some embodiments, a refresh code can specify that only data elements representing new information are to be refreshed. Icons can be placed on the web page identifying an initial state and indicating a lack of information since data is not yet discovered. The web server 100 sends either final data or placeholder data, such as an icon or "loading text" and a refresh code. For data that is not yet received, the web server 100 sends the placeholder to the web browser 116. When the data becomes available, the web server 100 sends the updated web page and the web browser 116 replaces the icon with data in the web page. Refreshing of only portions of the web page for which data was previously unavailable improves efficiency, reduces data transfer, and can enable faster creation of a fully updated web page.

Figure 2D:
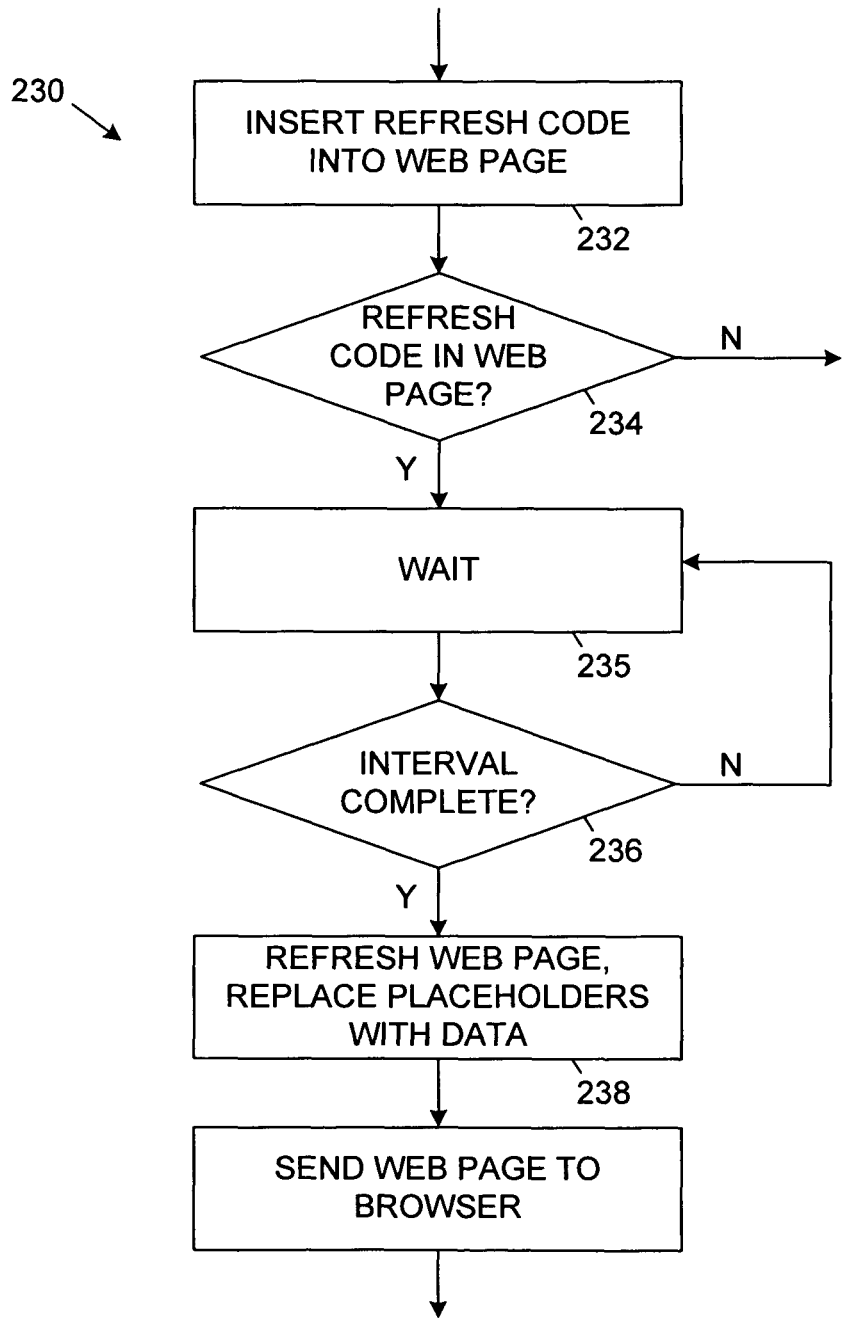

Referring to FIG. 3A and FIG. 2D in combination with FIG. 1, an example of a web page 300 and an embodiment of a method 230 for handling the web page 300 are shown. The web server 100 inserts 232 a refresh code 302 into the web page 300. In the case 234 of the web page 300 with the inserted refresh code 302, the web server 100 and/or web application 112 waits 235 a selected time interval and, at expiration 236 of the time interval, refreshes 238 the web page 300 whereby newly received data 304 replaces a placeholder 306. In some embodiments, the selected refresh timeout interval can be adjusted based on network speed.

Figure 2E:
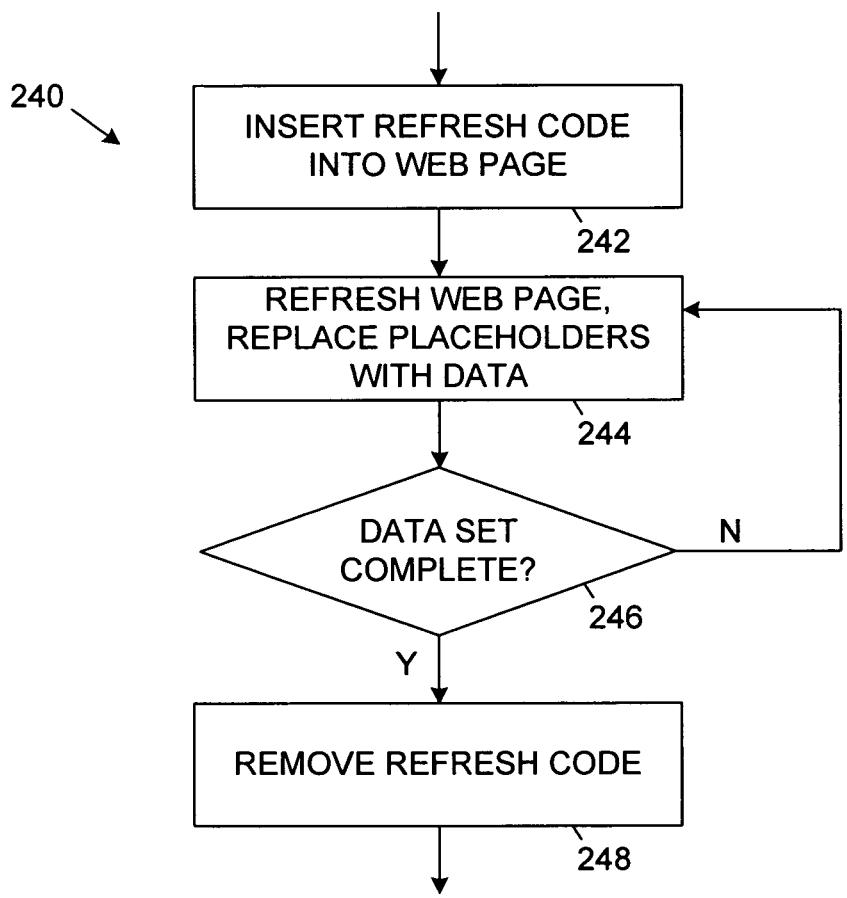

Referring to FIG. 3A and FIG. 2E in combination with FIG. 1, an example of a web page 300 and an embodiment of a method 240 for handling the web page 300 are shown. The web server 100 inserts 242 a refresh code 302 into the web page 320 and the web browser 116 refreshes 244 the web page 300 whereby newly received data 304 replaces a placeholder 306 for the web page 300 with the inserted refresh code 302. The web application 112 running on the web server 100 can also determine 246 when a complete set of data 304 is received and replaces 248 the refresh code 302 with data for display in the web page 300 upon completion of the data set. Thus, when complete data is sent to the browser 116 no refresh code is included, but if incomplete data is sent, the web application 112 includes the refresh code.

Accordingly, a web page that is retransmitted also can include a code that enables an iterative process for web page creation. The web server receives a refresh request from the web browser and the server uses the newly received data and creates a new page. If new page is still not complete then the web server retains the refresh code in the web page and transmits the page back to the browser. If the new page is complete, the web server does not retain the refresh code in the web page.

Figure 2F:
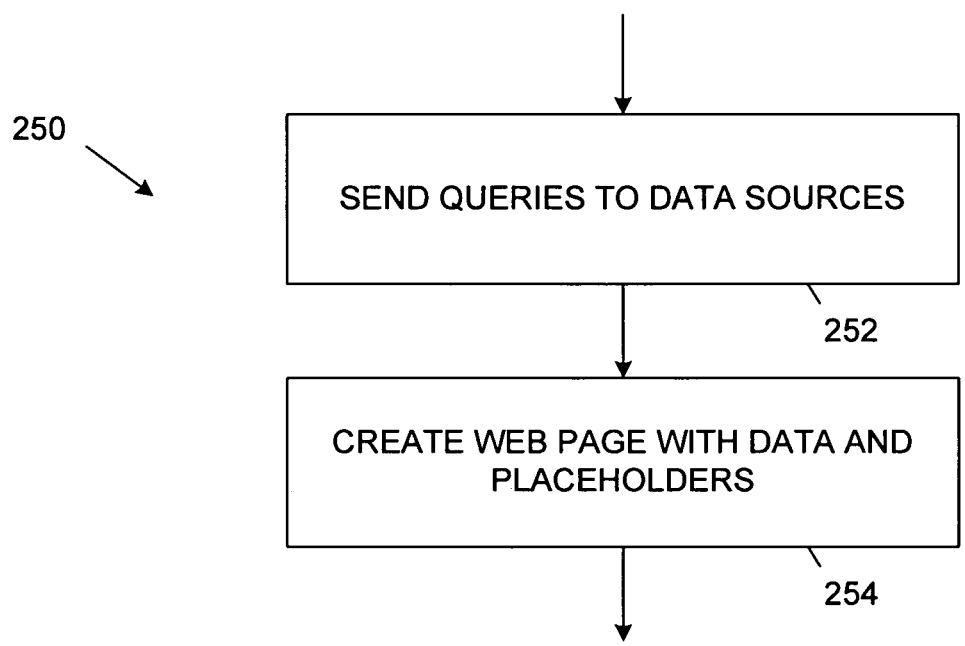
Figure 2G:
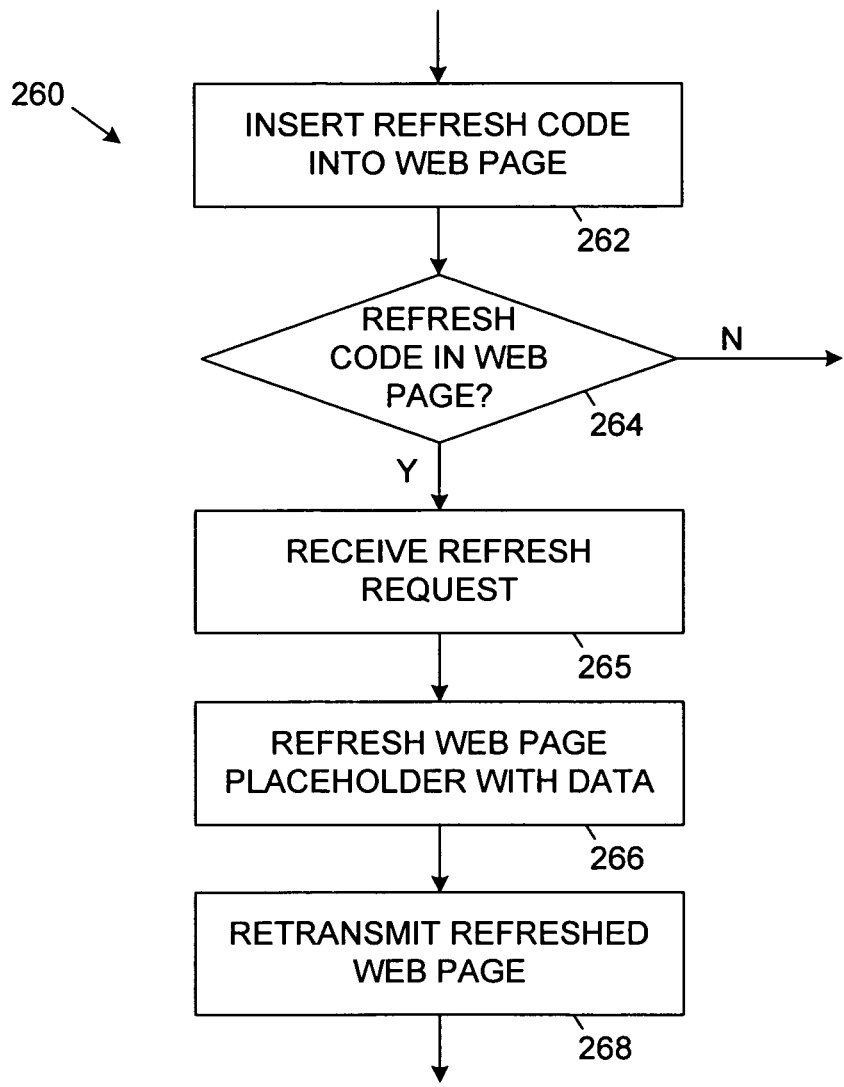

Referring to FIG. 2F in combination with FIG. 1, a flow chart depicts an embodiment of a method 250 for further handling a web page 114. The web server 100 and/or a web application 112 can send 252 one or more queries in one or more background threads and create 254 the web page 114 with that is already available. On the web server 100 and/or in a web application 112, multiple threads can run, collecting data from multiple various sources. The thread that creates the web page can either wait for all data collection to complete, or can take the results from threads that have already completed and create a page including any placeholder data or refresh codes for transmission to the web browser. Referring to FIG.

2G in combination with FIG. 1, a flow chart depicts an embodiment of a method 260 for further handling a web page 114. The refresh code is inserted 262 into the web page 114. For a web page 114 containing the inserted refresh code 264, the web server 100 receives 265 a refresh request from the web browser 116 for the web page 114, refreshes 266 the web page 114 whereby newly received data replaces a placeholder, and retransmits 268 the refreshed web page 114 to the web browser 116.

Figure 4:
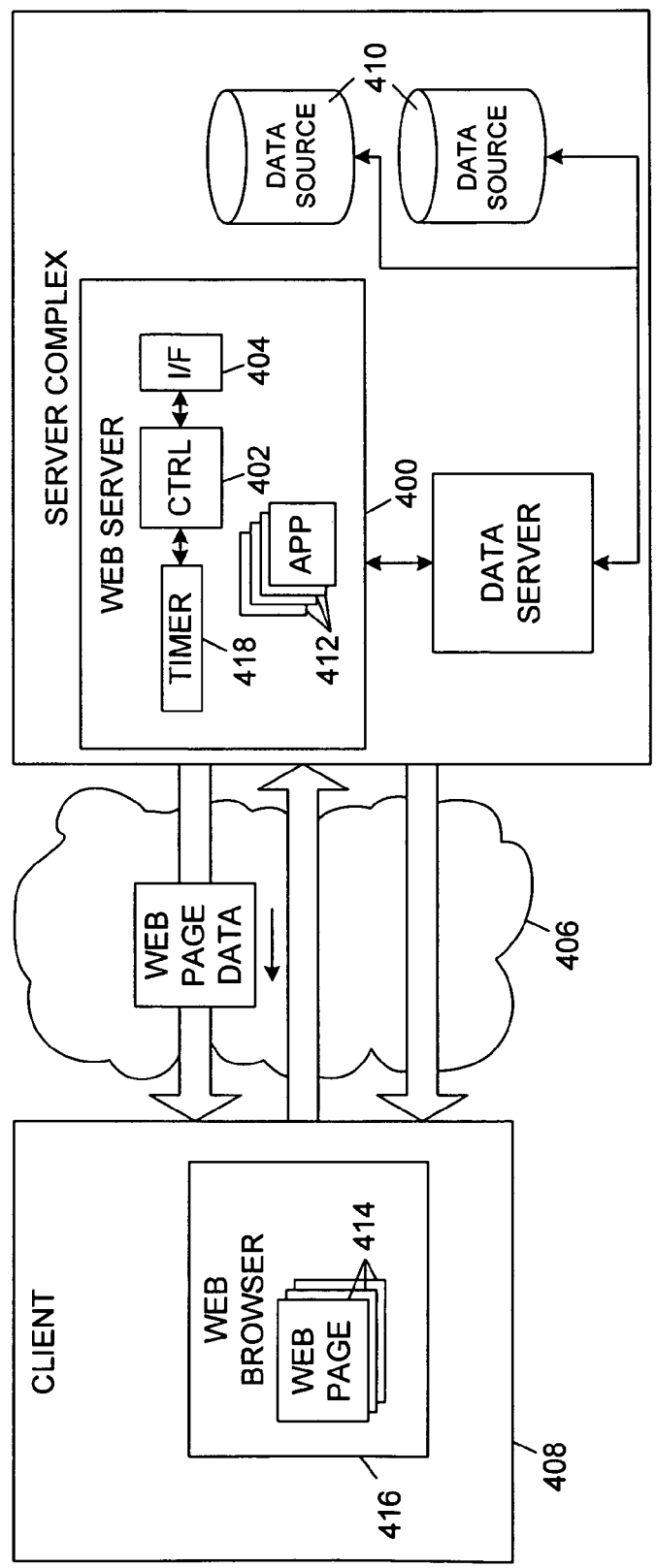
FIG. 4 is a schematic block diagram depicting an embodiment of a web server that is adapted to operate in multiple modes with respect to executing fast display of a web page based on tracked time durations.

In some embodiments, the time duration for transmission of a web page from a web server and the web browser can be tracked and the technique for displaying a web page selectively determined based on the tracked time duration. Referring to FIG. 4, a schematic block diagram illustrates an embodiment of a web server 400 that can is adapted to operate in multiple modes with respect to executing fast display of a web page 414 based on tracked time durations. The web server 400 can server one or more web clients 408 to enable display of the web page 414 via a web browser 416 that runs on a web client 408. The illustrative web client 408 can be any suitable web-connected device such as a computer system, a terminal, a personal digital assistant (PDA), mobile phone, or other device.

The illustrative web server 400 comprises a controller 402 such as central processing unit (CPU), a communication interface 404 adapted to communicate on a network 406 among one or more web browser 416 and multiple data sources 410, and a timer 418. The web server 400 can be operated to run various web applications 412.

Figure 5A:
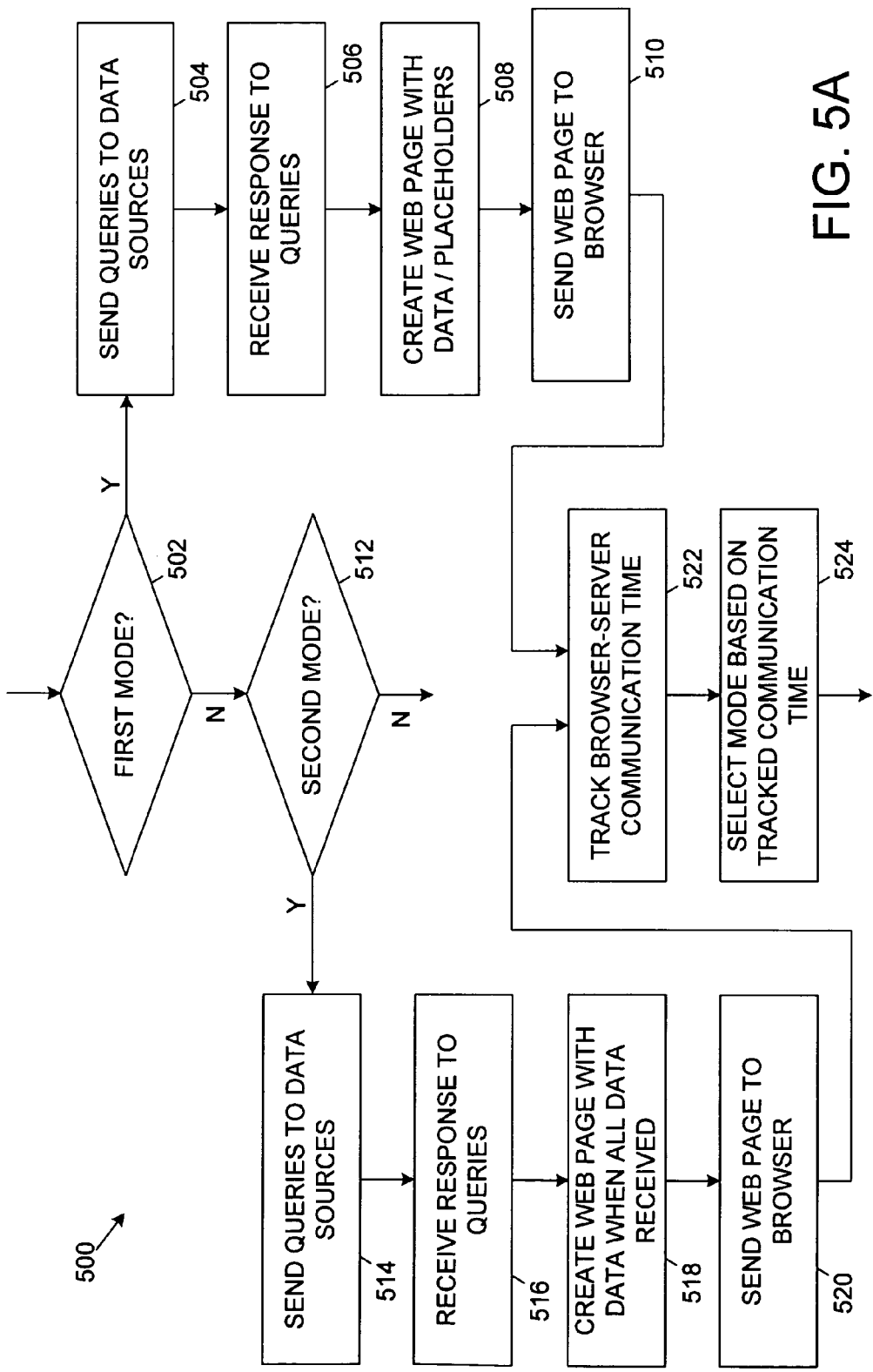
FIGS. 5A and 5B are schematic flow charts showing embodiments of a method for operating the web server in multiple modes to execute fast display of the web page with available data.
Figure 5B:
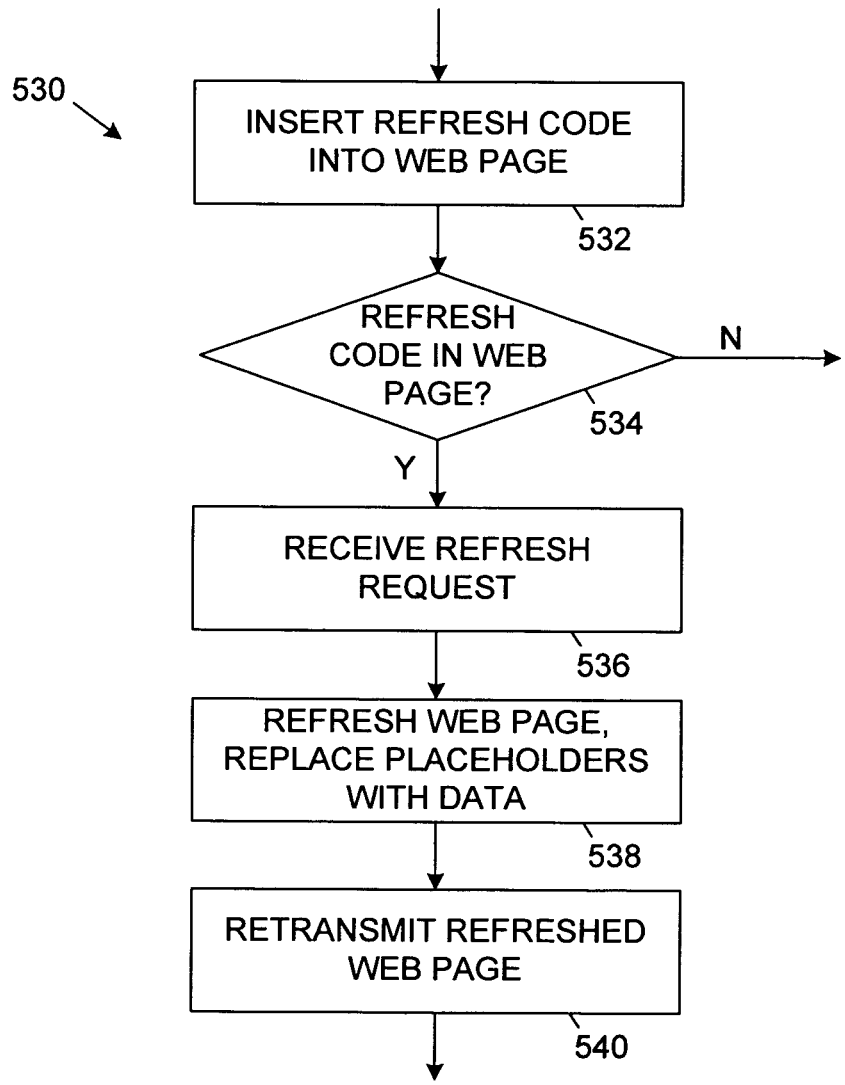

Referring to FIGS. 5A and 5B in combination with FIG. 4, multiple flow charts depict embodiments of a method 500 for operating the web server 400 in multiple modes to execute fast display of the web page 414 with available data. The method can be executed by the controller 402 adapted with programming for running a web application 412 and using the timer 418 to determine an operating mode. The controller 402 can optionally operate 502 in a first mode comprising sending 504 one or more queries to one or more data sources 410 and receiving 506 data in response to the queries. The controller 402 creates 508 the web page 414 to include received data and placeholders for yet to be received data. The controller 402 transmits 510 the web page 414 to the web browser 416 regardless of web page completion. During optional operation 512 in a second mode comprising sending 514 one or more queries to one or more data sources 410 and receiving 516 data in response to the queries. The controller 402 creates 518 the web page 414 which includes received data when all data from the queries is received and transmits 520 the web page 414 with all queried data to the web browser 416. The controller 402 tracks 522 the time for communication between the web server 400 and the web browser 416 and selects 524 between the first and second modes based on the tracked communication time.

On relatively slow network communication connections, frequent page refreshes may take longer than simply waiting for the data to become available. The web server 400 can track the time for communicating with the web browser 416 and adjust the operating strategy. Accordingly, a user and/or the controller 402 can select the first mode for relatively faster communication and select the second mode for relatively slower communication. For example, the web server 400 and/or web application 412 can be configured to perform full discovery prior to page creation and transmission on slow connections, and may perform incomplete page creation and transmission on fast connections.

Referring to FIG. 5B in combination with FIG. 4, a flow chart depicts an embodiment of a method 530 for further handling a web page 414. The refresh code is inserted 532 into the web page 414. For a web page 414 containing the inserted refresh code 534, the web server 400 can receive 536 a refresh request from the web browser 416 directed to the web page 414, refresh 538 the web page 414 so that newly received data replaces a placeholder, and retransmit 540 the refreshed web page 414 to the web browser 416.

In some embodiments, a user and/or the controller 402 can adjust 550 refresh rate based on the tracked communication time.

Figure 6:
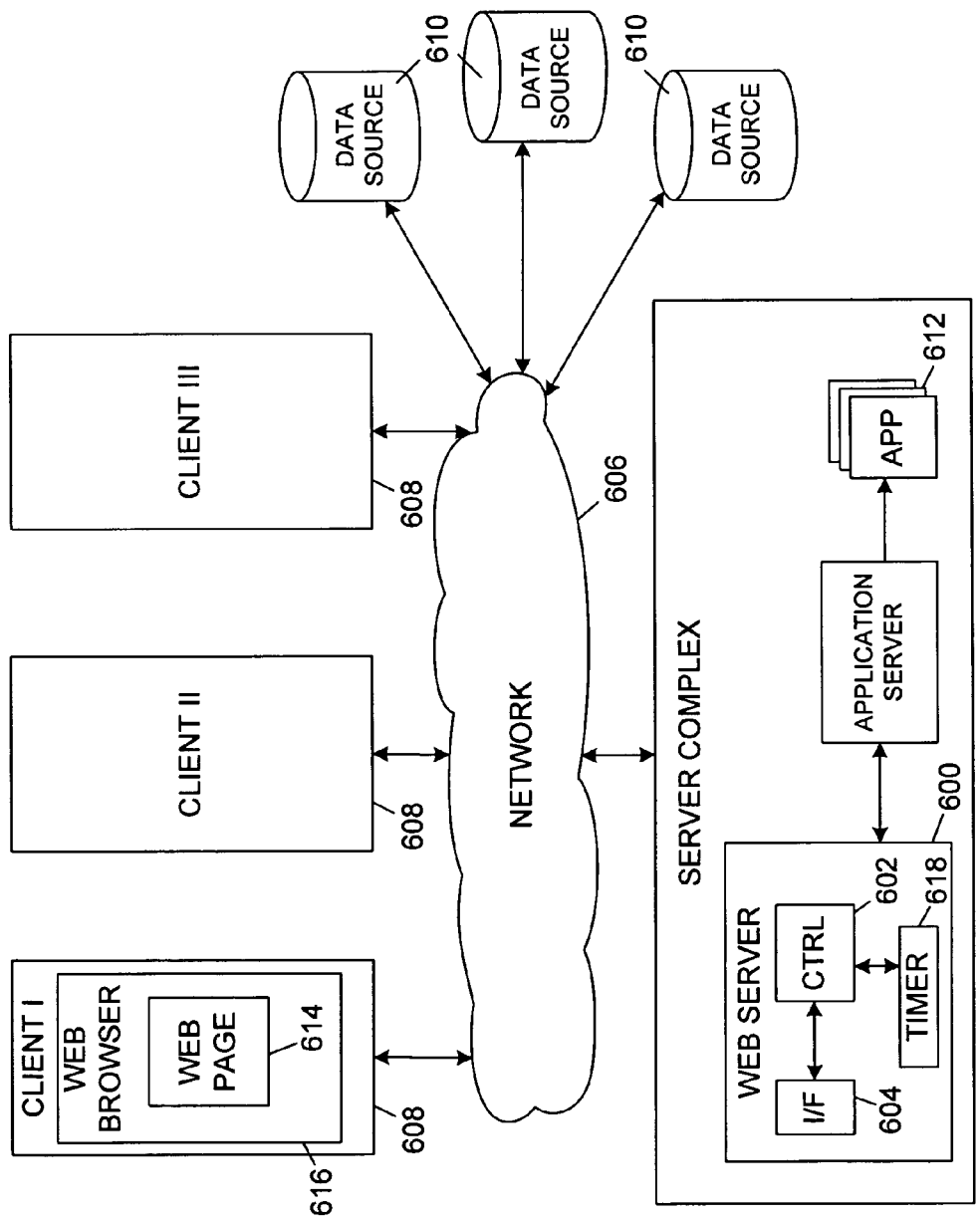
FIG. 6 is a schematic block diagram depicting an embodiment of a web server that is adapted to operate in multiple modes with respect to executing fast display of a web page.

Referring to FIG. 6, a schematic block diagram illustrates an embodiment of a web server 600 that is adapted to operate in multiple modes with respect to executing fast display of a web page 614. The web server 600 can comprise a controller 602 such as a central processing unit (CPU), and a communication interface 604 adapted to communicate on a network 606 among one or more clients 608 and multiple data sources 610. Some embodiments of the web server 600 may include a timer 618.

Figure 7A:
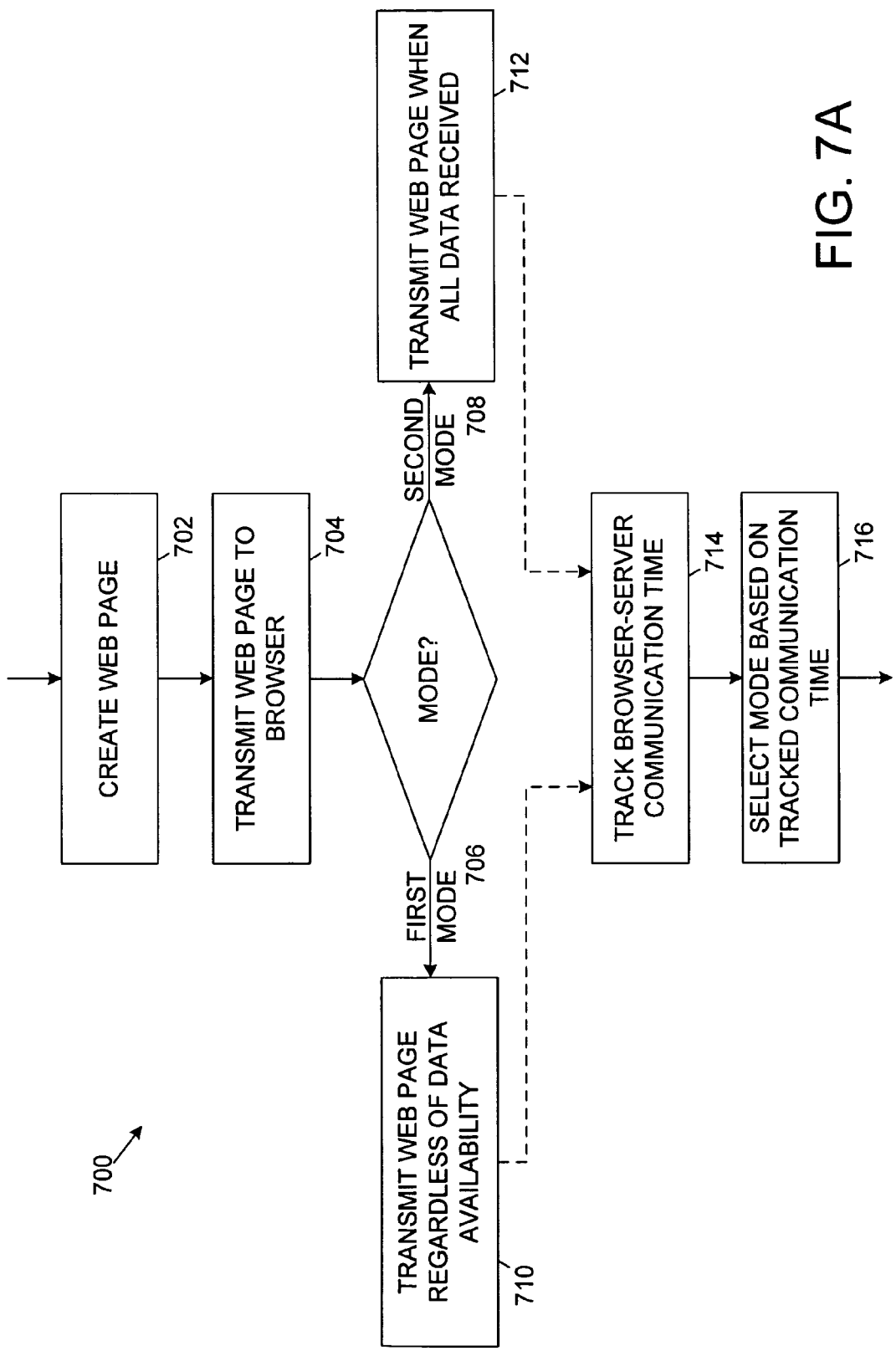
FIGS. 7A and 7B are flow charts that show embodiments of a method for operating the web server in multiple modes to execute fast display of the web page with available data.
Figure 7B:
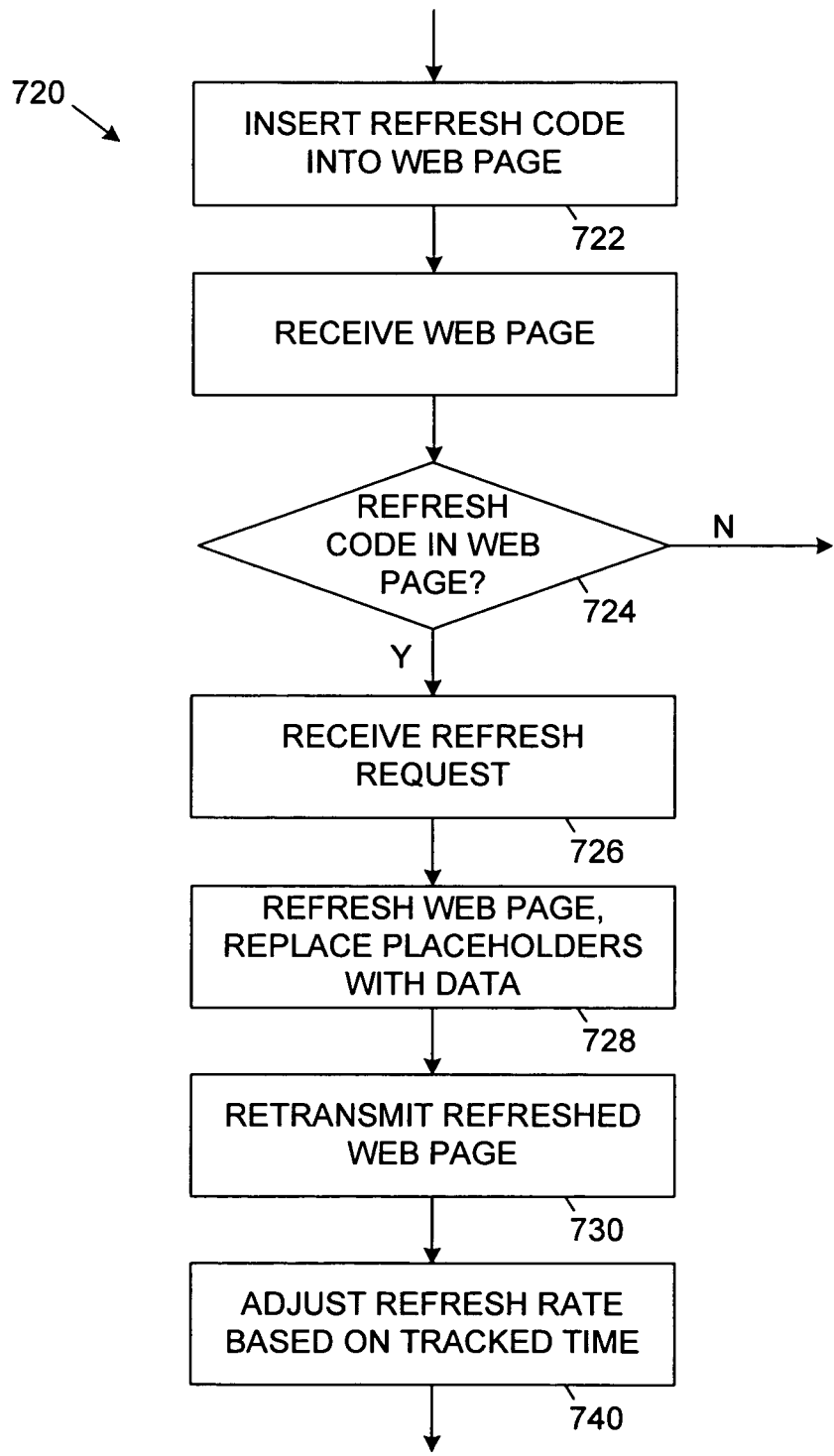

Referring to FIGS. 7A and 7B in combination with FIG. 6, multiple flow charts depict embodiments of a method 700 for operating the web server 600 in multiple modes to execute fast display of the web page 614 with available data. The method can be executed by the controller 602 adapted with programming for running a web application 612. The method 700 for operating the web server 600 comprises creating 702 a web page 614 from data accumulated in a plurality of data source queries, transmitting 704 the web page 614 to a web browser 616, and selectively operating in a first mode 706 or a second mode 708. The first mode 706 comprises transmitting 710 the web page 614 regardless of availability of data from the data source. The second mode 708 comprises transmitting 712 the web page after all data from the data source is received.

In some embodiments, the method 700 may comprise tracking 714 time for communication between the web server 600 and the web browser 616, and selecting 716 between the first and second modes based on the tracked communication time.

Referring to FIG. 7B in combination with FIG. 6, a flow chart depicts an embodiment of a method 720 for further handling a web page 614. The refresh code is inserted 722 into the web page 614. For a web page 614 containing the inserted refresh code 724, the web server 600 can receive 726 a refresh request from the web browser 616 directed to the web page 614, refresh 728 the web page 614 so that newly received data replaces a placeholder, and retransmit 730 the refreshed web page 614 to the web browser 616. In some embodiments, refresh rate can be adjusted 740 based on the tracked communication time. Also, in some embodiments the first mode is selected to attain relatively faster communications and the second mode is selected in conditions of relatively slower communications.

A conventional web page may contain many tags that cause the browser to contact a web server for additional information. Tags may be image or iframe tags, for example. A server assembles requested data to form the web page, possibly from multiple data sources, and once the web page is complete, the web page is transmitted from the web server to the web browser. A user may have the illusion that the web page loads quickly and then fills gaps by loading images and frames over time. However, what actually transpires is that the web server does not send the page until the images and frames making up the page are complete. The illusion of page filling over time occurs due to network bandwidth constraints whereby the web browser displays each portion of data as the data is received. In contrast, the various web servers, web applications, and associated methods described herein operate from the perspective of transmitting data from a web server to a requesting browser possibly before all data for the page is gathered from various data sources. Accordingly, receipt of the web page by the browser is not limited by the time for constructing the page at the web server and is not limited by availability of data, images, and/or frames at the web server.

In some embodiments, the illustrative methods, systems, structures, and devices can be implemented using Hypertext Transfer Protocol (HTTP) for communicating information on the World Wide Web (WWW) as an example of a request/response protocol between clients and servers. An originating client, for example a web browser or other user tool makes requests of a destination server which stores or creates resources such as Hypertext Markup Language (HTML) files and images via intermediaries such as proxies, gateways, and tunnels. An HTTP client initiates a request by establishing a Transmission Control Protocol (TCP) connection to a particular port on a remote host. An HTTP server listening on that port waits for the client to send a request message. Upon receiving the request, the server sends back a status line and a return message, the body of which can be the request file, an error message, or other information.

In other embodiments, the illustrative methods, systems, structures, and devices can be implemented using eXtensible Markup Language (XML) HTTP Request (XMLHttpRequest) protocol, which can also be called AJAX protocol. In AJAX, any action by a user, for example mouse clicks, keystrokes, or the like, is transmitted to a server which determines whether any response is appropriate and, if so, sends a response. The browser receives the response which includes code that is executed by the browser. The code causes content changes on the page that is currently displayed by the browser. Periodically, for example every 15 seconds, without any user interaction the browser sends a transmission to the server in the event the server has changes to make to the page currently displayed. The server sends a response back to the browser which is executed to make changes, as appropriate, to the current page. In the context of the methods, systems, and structures illustrated herein, a subset of a web page can be created which comprises received data and placeholders for yet to be received data. The web page can be transmitted to the web browser regardless of web page completion.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method for executing a web application comprising:
sending at least one query to at least one data source;
receiving data in response to the at least one query;
creating a web page having separate portions, a first portion of said portions for displaying received data, a second portion of said portions for displaying a first placeholder for yet to be received data;
inserting at least a first refresh code in said second portion; and
transmitting said web page to a web browser.

2. A method as recited in claim 1 wherein said portions include a third portion for displaying a second placeholder, said inserting involving a second refresh code in said third portion.

3. A method as recited in claim 1 further comprising in response to said first refresh code, refreshing said second portion without refreshing said first portion whereby newly received data replaces said first placeholder.

4. A method as recited in claim 3 wherein said first refresh code specifies a first time interval, said refreshing occurring at expiration of said first time interval.

5. A method as recited in claim 3 further comprising determining when data for said second portion has been received and performing said refreshing in response to said determining so as to remove said first refresh code from said second portion.

6. A method as recited in claim 3 further comprising:
sending the at least one query in at least one background thread; and
creating said web page with data that is already available.

7. A method as recited in claim 3 further comprising:
receiving a refresh request from the web browser directed to the web page;
responding to said refresh request by performing said refreshing; and
retransmitting a resulting refreshed web page to said web browser.

8. A method as recited in claim 3 further comprising:
repeatedly refreshing said first portion whereby newly received data replaces said placeholder once a complete set of data is received.

9. A method as recited in claim 3 further comprising tracking time for communication between the web server and the web browser.

10. A method as recited in claim 3 further comprising:
operating in a first mode involving:
sending the at least one query to the at least one data source;
receiving the data in response to the at least one query;
creating the web page including received data and placeholders for yet to be received data; and
transmitting the web page to the web browser regardless of web page completion;
operating in a second mode involving:
sending the at least one query to the at least one data source;
receiving the data in response to the at least one query;
creating the web page including received data when all data from the at least one query is received; and
transmitting the web page including all queried data to the web browser;
tracking time for communication between the web server and the web browser; and
selecting between the first and second modes based on the tracked communication time.

11. A method as recited in claim 10 further comprising:
inserting a refresh code in the web page; and
for a web page with the inserted refresh code:
receiving a refresh request from the web browser directed to the web page;
refreshing the web page whereby newly received data replaces a placeholder; and
retransmitting the refreshed web page to the web browser.

12. A method as recited in claim 11 further comprising selecting the first mode for relatively faster communication and selecting the second mode for relatively slower communication.

13. A method as recited in claim 11 further comprising adjusting refresh rate based on the tracked communication time.

14. A method as recited in claim 3 further comprising executing the web application using a Hypertext Transfer Protocol (HTTP) protocol or an eXtensible Markup Language (XML) HTTP Request (XMLHttpRequest) protocol.

15. A method for operating a web server comprising:
creating a web page from data accumulated in a plurality of data source queries;
transmitting the web page to a web browser; and
selectively operating in a first mode or a second mode,
said first mode providing for dividing said web page into separate portions, a first portion of said portions for displaying received data, a second portion of said portions for displaying a first placeholder for yet to be received data, and transmitting the web page regardless of availability of data from the data source, and
said second mode involving transmitting the web page after all data from the data source is received.

16. A method as recited in claim 15 further comprising:
tracking time for communication between said web server and said web browser; and
selecting between said first and second modes based on the tracked communication time.

17. A method as recited in claim 15 further comprising:
inserting a refresh code in the web page while operating in the first mode; and
for a web page with the inserted refresh code:
receiving a refresh request from said web browser directed to the web page;
refreshing said web page whereby newly received data replaces a placeholder; and
retransmitting the refreshed web page to the web browser.

18. A method as recited in claim 17 further comprising adjusting refresh rate based on the tracked communication time.

19. A method as recited in claim 15 further comprising selecting the first mode for relatively faster communication and selecting the second mode for relatively slower communication.

20. An apparatus comprising non-transitory controller usable storage media encoded with program code including:
code adapted to cause a controller to create a web page from data accumulated in a plurality of data source query requests;
code adapted to cause the controller to transmit the web page to a web browser; and
code adapted to cause the controller to selectively operate in a first mode or a second mode, the first mode comprising transmitting the web page regardless of availability of data from the data source and the second mode comprising transmitting the web page after all data from a data source is received, said first mode involving, when not all of said data is received from said data source, creating the web page with separate portions, a first portion of said portions for displaying received data, a second portion of said portions for displaying a first placeholder for yet to be received data.

21. An apparatus as recited in claim 20 further comprising:
said controller; and
a communication interface coupled to the controller and adapted to communicate on a network among at least one client and a plurality of data stores, the controller adapted to execute a web application that sends query requests to at least one data source, receives data in response to the query requests, creates a web page comprising received data and placeholders for yet to be received data, and transmits the web page to a web browser executing on the at least one client regardless of web page completion.

* * * * *

UNITED STATES PATENT AND TRADEMARK OFFICE
CERTIFICATE OF CORRECTION

| | | |
|---|---|---|
| PATENT NO. | : 8,595,612 B1 | Page 1 of 1 |
| APPLICATION NO. | : 11/586872 | |
| DATED | : November 26, 2013 | |
| INVENTOR(S) | : Edgar Circenis et al. | |

It is certified that error appears in the above-identified patent and that said Letters Patent is hereby corrected as shown below:

On the Title page, in item (73), Assignee, in column 1, line 1,
delete "Development," and insert -- Development Company, --, therefor.

Signed and Sealed this
Seventeenth Day of June, 2014

Michelle K. Lee
*Deputy Director of the United States Patent and Trademark Office*